United States Patent [19]

Lim et al.

[11] Patent Number: 5,560,697

[45] Date of Patent: Oct. 1, 1996

[54] OPTICAL PROJECTION SYSTEM

[75] Inventors: Dae-Young Lim, Seoul; Jin-Se Yang, Kyunggi-Do, both of Rep. of Korea

[73] Assignee: Daewoo Electronics Co., Ltd., Seoul, Rep. of Korea

[21] Appl. No.: 400,727

[22] Filed: Mar. 8, 1995

[30] Foreign Application Priority Data

Mar. 9, 1994 [KR] Rep. of Korea .................. 94-4517
Mar. 9, 1994 [KR] Rep. of Korea .................. 94-4518

[51] Int. Cl.[6] ........................................ G03B 21/28
[52] U.S. Cl. .................... 353/37; 353/99; 353/31; 353/34; 348/771
[58] Field of Search ...................... 353/97, 99, 101, 353/102, 122, 31, 34, 37, 98; 348/770, 771, 755; 359/223, 224, 850, 851

[56] References Cited

U.S. PATENT DOCUMENTS

| | | | |
|---|---|---|---|
| 5,170,250 | 12/1992 | Ledebuhr | 353/38 |
| 5,235,444 | 8/1993 | de Vaan | 353/34 |
| 5,245,369 | 9/1993 | Um et al. | 353/122 |
| 5,260,798 | 11/1993 | Um et al. | 348/770 |
| 5,369,433 | 11/1994 | Baldwin et al. | 348/771 |
| 5,402,184 | 3/1995 | O'Grady et al. | 348/771 |
| 5,420,655 | 5/1995 | Shimizu | 353/34 |
| 5,486,881 | 1/1996 | Hwang | 353/34 |

FOREIGN PATENT DOCUMENTS

| | | | |
|---|---|---|---|
| 0139991 | 5/1985 | European Pat. Off. | |
| 5-053224 | 3/1993 | Japan | 353/20 |
| A91 09503 | 6/1991 | WIPO | |
| A93 19620 | 9/1993 | WIPO | |

Primary Examiner—William C. Dowling
Attorney, Agent, or Firm—Anderson Kill Olick & Oshinsky, P.C.

[57] ABSTRACT

An optical projection system comprises a non-point white light source, a source lens, a source stopper, an optical means, a first, a second and a third arrays of M×N actuated mirrors, a beam splitting means including a first and a second dichroic lens, a first, a second and a third field lenses, a projection stopper, a projection lens and a projection screen. Each of the field lenses is located between each of the dichroic mirrors and each of the arrays of actuated mirrors and is used for collimating each of the primary light beams onto the corresponding array of actuated mirrors and refocussing each of the reflected primary light beams from the via the beam splitting means, and the optical means, and eventually onto the projection stopper.

11 Claims, 4 Drawing Sheets

OPTICAL PROJECTION SYSTEM

FIELD OF THE INVENTION

The present invention relates to an optical projection system; and, more particularly, to an optical projection system having a novel optical baffling means.

BACKGROUND OF THE INVENTION

Among the various video display systems available in the art, an optical projection system is known to be capable of providing high quality images in a large scale.

In FIG. 1, there is illustrated a prior art optical projection system 100 comprising non-point white light source 1, a Schlieren bar 2 provided with a plurality of reflective surfaces and corresponding number of slits, a source lens 3, a projection lens 4, a field lens system 5, a projection screen 6, a beam splitting means 7 including a first and a second dichroic mirrors 8, 9, and a first, a second and a third arrays 10, 11, 12 of M×N actuated mirrors 13.

In such a system, a white light emanating from the non-point white light source 1 is focused along a first optical light path onto the reflective surfaces of the Schlieren bar 2 by the source lens 3, wherein the white light consists of a first, a second and a third primary light beams, each of the primary light beams being one of the primary colors. The reflective surfaces of the Schlieren bar 2 are in a facing relationship with the source lens 3 and the field lens system 5. The white light reflected from each of the reflective surfaces diverges along a second optical path and collimated by the field lens system 5, thereby being uniformly illuminated onto the beam splitting means 7 including the first and second dichroic mirrors 8,9, wherein the first dichroic mirror 8 is disposed between the field lens system 5 and the second dichroic mirror 9 facing the first array 10 of M×N actuated mirrors 13, and the second dichroic mirror 9, between the first dichroic mirror 8 and the third array 10 of M×N actuated mirrors 13 facing the second array 11 of M×N actuated mirrors 13. The first dichroic mirror 8 receives the white light from the field lens system 5, reflects the first primary light beam of the white light to the first array 10 of M×N actuated mirrors 13, and transmits the second and third primary light beams to the second dichroic mirror 9, which, in turn, receives the second and third primary light beams from the first dichroic mirror 8, reflects the second primary light beam to the second array 11 of M×N actuated mirrors 13, and transmits the third primary light beam to the third array 12 of M×N actuated mirrors 13. Each of the actuated mirrors 13 of the arrays 10, 11, 12 corresponds to each of the pixels to be displayed.

The optical path of the reflected primary light beams from each of the actuated mirrors 13 in each of the arrays 10, 11, 12 is determined by the amount of deflection thereof.

The reflected primary light beams from each of the undeflected actuated mirrors in each of the arrays 10, 11, 12 are focused back to the Schlieren bar 2 by the field lens system 5 via the first and second dichroic mirrors 8, 9 along the second optical path and stopped by the reflective surfaces thereof, whereas the reflected primary light beams from each of the deflected actuated mirrors in each of the arrays 10, 11, 12 are focused back to the Schlieren bar 2 by the field lens system 5 via the first and second dichroic mirrors 8, 9 along a third optical path so that a portion of the focused light beams passes the slits thereof. The primary light beams from each of the actuated mirrors 13 in each of the arrays 10, 11, 12 which pass through the slits are transmitted to the projection lens 4 which projects the transmitted primary light beams from each of the actuated mirrors 13 in each of the arrays 10, 11, 12 on the projection screen 6, thereby displaying each of the pixels corresponding thereto.

One of the major shortcomings of the above-described optical projection system 100 arises from the use of the Schlieren bar 2. Since the white light emanating from the non-point light source 1 is focused onto the reflective surfaces of the Schlieren bar 2 at a fixed angle, the reflected white light therefrom is extremely divergent and has a large beam diameter, and in order to uniformly illuminate such a white light onto the beam splitting means 7 and onto the arrays 10, 11, 12 of M×N actuated mirrors 13 and then refocus the reflected light from the arrays 10, 11, 12 of M×N actuated mirrors 13 to the Schlieren bar 2, the field lens system 5 employed therein must become extremely complicated.

SUMMARY OF THE INVENTION

It is, therefore, a primary object of the present invention to provide an optical projection system without using a Schlieren bar, thereby eliminating a need to provide a complicated field lens system therefor.

In accordance with the present invention, there is provided an optical projection system capable of displaying an M×N number of pixels, wherein M and N are integers, comprising: a non-point white light source for emitting a white light along a first optical path on a first optical plane, wherein the white light consists of a first, second and a third primary light beams, each of the primary light beams being one of the primary colors; a trinity of arrays of M×N actuated mirrors, including a first, a second and a third arrays of M×N actuated mirrors, each of the actuated mirrors having an actuator and a mirror attached thereto, each of the actuated mirrors in the arrays being capable of changing the optical path of the primary light beams reflected therefrom; a source stopper, provided with a light transmitting portion having a specific configuration and a light stopping portion and being placed on the first optical path on the first optical plane, for shaping the white light from the non-point white light source into a predetermined configuration; a source lens, disposed between the source stopper and the non-point white light source, for focusing the white light emitted by the non-point white light source onto the source stopper; an optical means for reflecting the white light from the source stopper at a predetermined angle; a beam splitting means including a first and a second dichroic mirrors, wherein the first dichroic mirror, disposed between the optical means and the second dichroic mirror facing the first array of M×N actuated mirror, is used for isolating and reflecting the first primary light beam of the white light from the optical means to the first array of M×N actuated mirrors and for transmitting the second and third primary light beams to the second dichroic mirror, and the second dichroic mirror, disposed between the first dichroic mirror and the third array of M×N actuated mirrors facing the second array of M×N actuated mirrors, upon receiving the second and third primary light beams from the first dichroic mirror, for isolating and reflecting the second primary light beam to the second array of M×N actuated mirrors, and for transmitting the third primary light beam to the third array of M×N actuated mirrors; a trinity of field lenses including a first, a second and third field lenses, each of the first, second and third field lenses being located between the first dichroic mirror and the first array of M×N actuated mirrors, between the second dichroic mirror and the second array of M×N actuated mirrors, and between the second dichroic mirror and the third array of M×N actuated mirrors, respectively, wherein each of the field lenses is used for collimating each of the primary light beams onto the corresponding array of M×N actuated mirrors and for focusing each of the primary light beams reflected from each of the actuated mirrors in each of the arrays; a projection screen for displaying an image made of the M×N number of pixels thereon; a projection stopper, provided with a light transmitting portion and a light stopping portion, for passing a predetermined amount of the reflected primary light beams from the trinity of the arrays of M×N actuated mirrors; and a projection lens for projecting the primary light beams from the projection stopper onto the projection screen, thereby displaying each of the pixels corresponding thereto.

BRIEF DESCRIPTION OF THE DRAWINGS

The present invention together with the above and other objects and advantages will become apparent from the following description of preferred embodiments given in conjunction with the accompanying drawings, wherein.

DETAILED DESCRIPTION OF THE PREFERRED EMBODIMENTS

Figure 1:
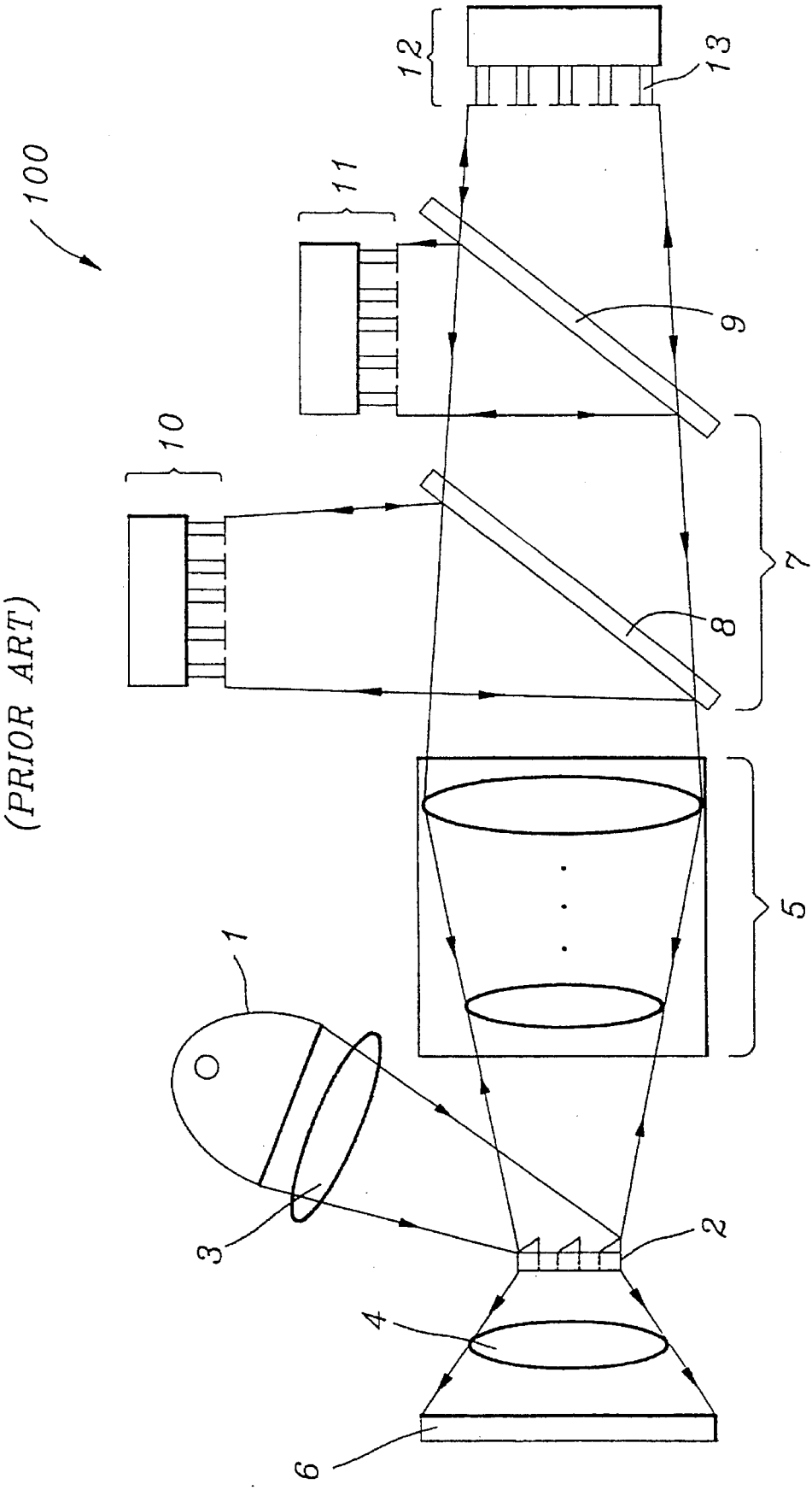
FIG. 1 represents a schematic view of a prior art optical projection system.
Figure 2:
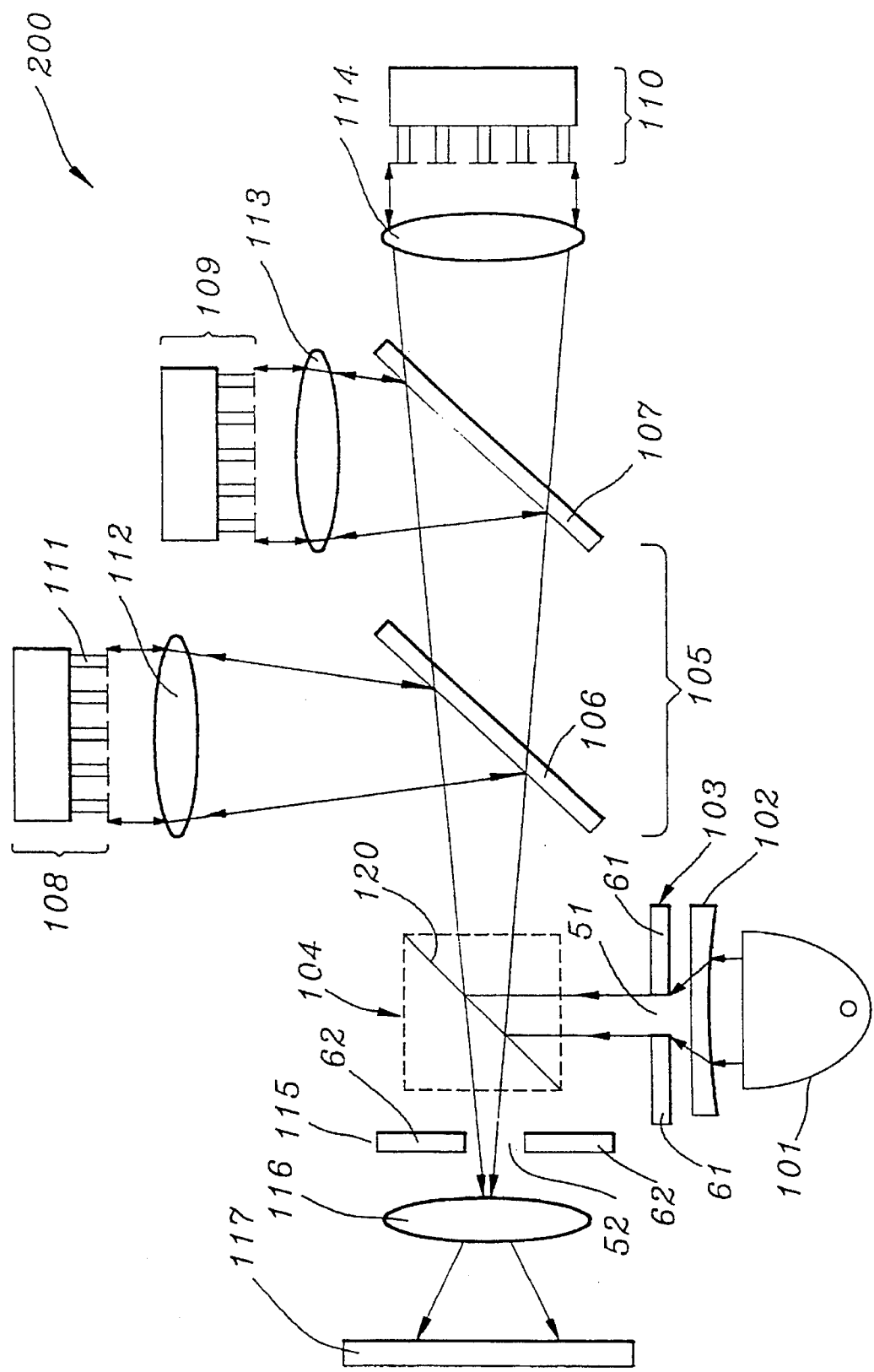
FIG. 2 illustrates a schematic view of an optical projection system in accordance with a preferred embodiment of the present invention.
Figure 3:
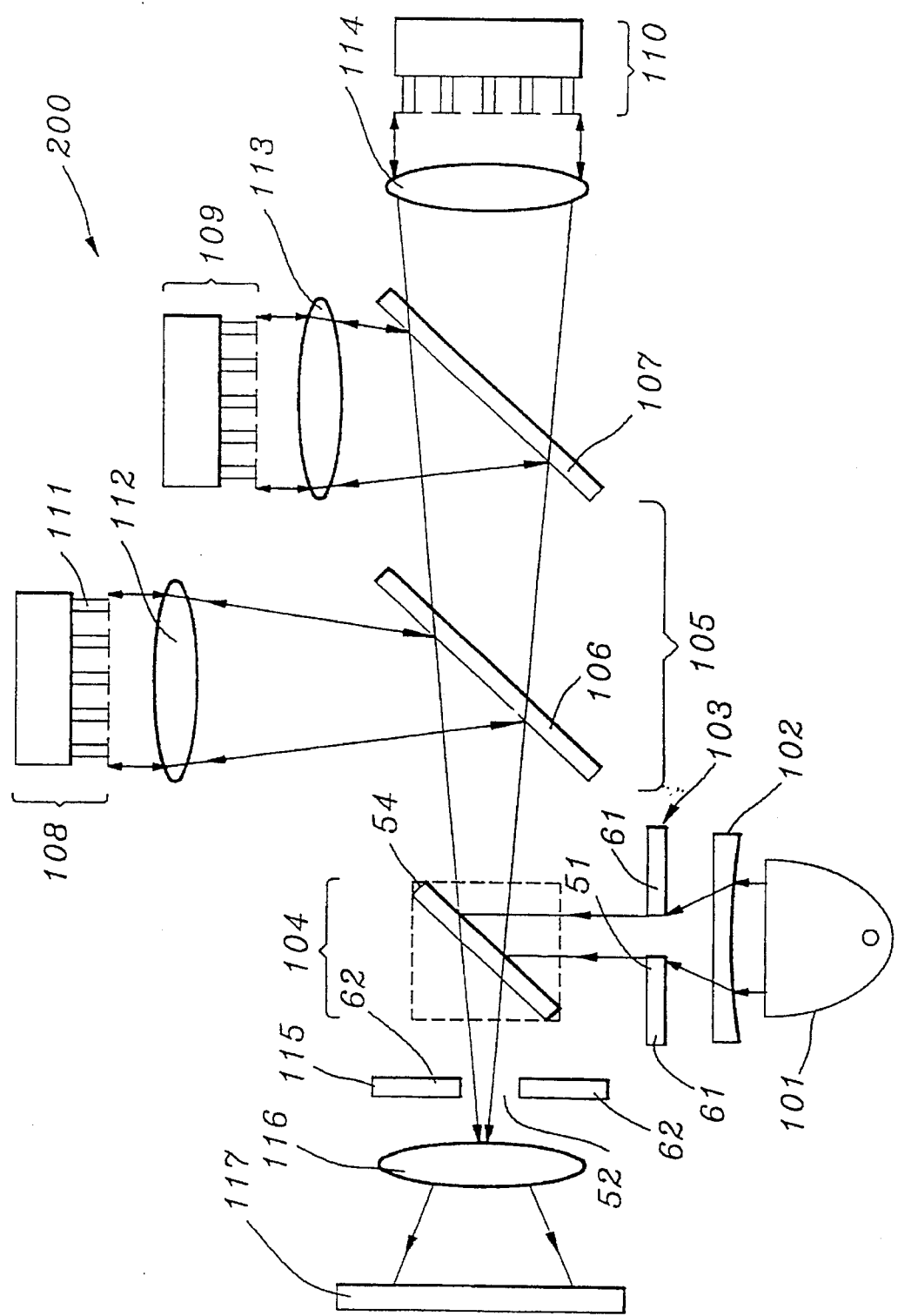
FIG. 3 shows a schematic view of the optical projection system incorporating therein a detailed view of the optical means shown in FIG. 2.
Figure 4:
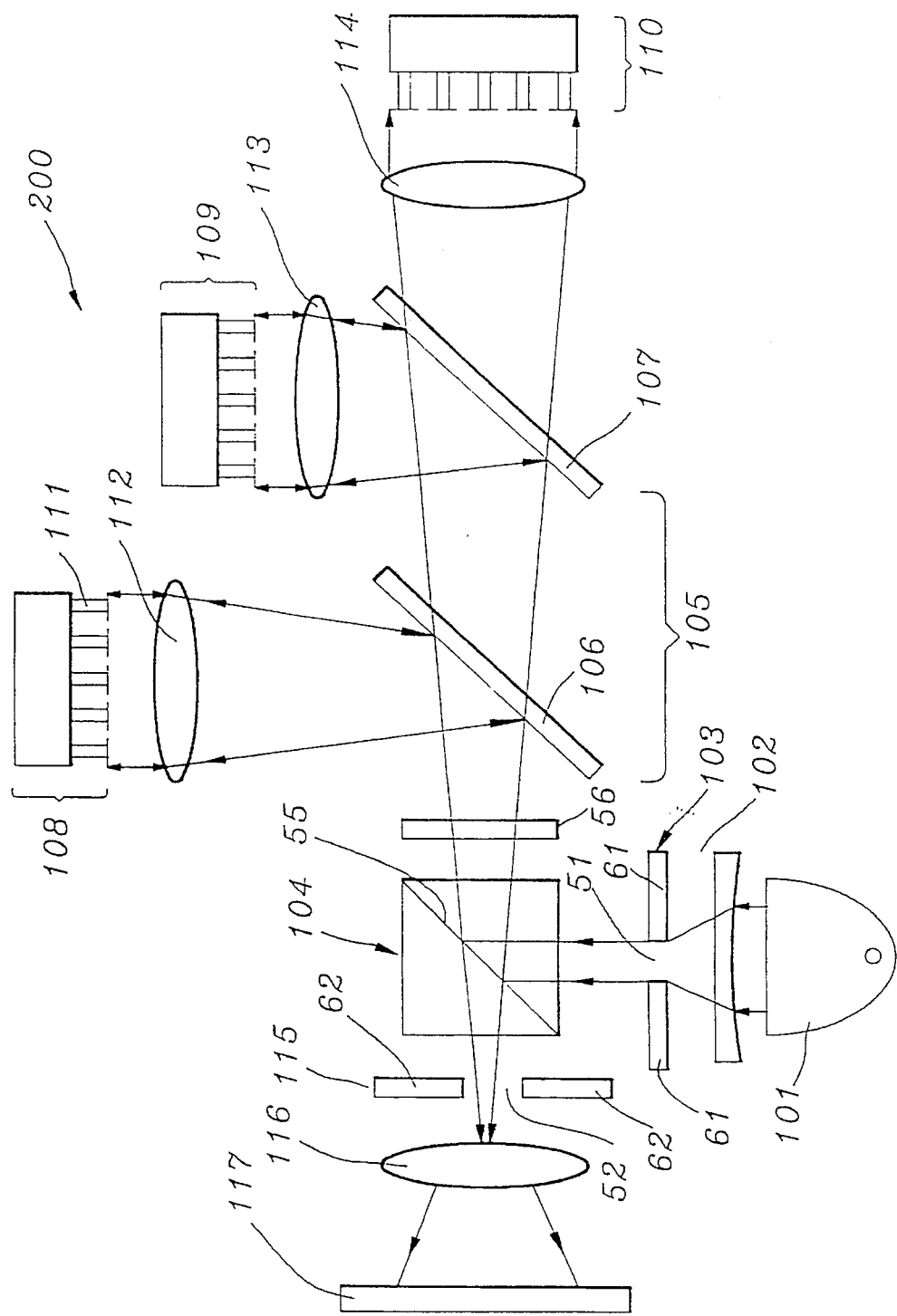
FIG. 4 depicts a schematic view of the optical projection system incorporating therein a detailed view of another optical means shown in FIG. 2.

Referring now to FIGS. 2 to 4, there are provided schematic views of the inventive optical projection system in accordance with preferred embodiments of the present invention. It should be noted that like parts appearing in FIGS. 2 to 4 are represented by like reference numerals.

In FIG. 2, there is illustrated a schematic view of the inventive optical projection system 200 comprising a non-point white light source 101, a source lens 102, a source stopper 103 provided with a light transmitting portion 51 having a specific configuration and a light stopping portion 61, an optical means 104 including a reflective surface 120, a beam splitting means 105 including a first and a second dichroic mirrors 106, 107, a trinity of arrays of M×N actuated mirrors 111 including a first, a second and a third arrays 108, 109, 110 of M×N actuated mirrors 111, a trinity of field lenses including a first, a second and a third field lenses 112, 113, 114, a projection stopper 115 provided with a light transmitting portion 52 having a specific configuration and a light stopping portion 62, a projection lens 116 and a projection screen 117.

In such a system, a white light emanating from the non-point white light source 101 is focused along a first optical path on a first optical plane onto the light transmitting portion 51 on the source stopper 103 by the source lens 102 located between the non-point white light source 101 and the source stopper 103, wherein the white light consists of a first, a second and a third primary light beams, each of the primary light beams being one of the primary colors. The source stopper 103 is used for shaping the white light from the non-point white light source 101 via the source lens 102 into a predetermined configuration by allowing a certain portion of the white light to pass through the light transmitting portion 51 thereof. The white light from the source stopper 103 having the predetermined configuration travels onto the reflective surface 120 of the optical means 104. The reflective surface 120 of the optical means 104, inclined at an angle, e.g., 48°–50° with respect to the first optical plane, is in a facing relationship with the source stopper 103 and the beam splitting means 105. The white light reflected from the reflective surface 120 of the optical means 104 travels along a second optical path, and is uniformly illuminated onto the beam splitting means 105 including the first and second dichroic mirrors 106,107. The second optical path is inclined 80°–100° with respect to the first optical path. The first dichroic mirror 106, inclined at an angle, e.g., 45°, and disposed between the optical means 104 and the second dichroic mirror 107 facing the first array 10 of M×N actuated mirrors 111, receives the white light from the reflective surface 120 of the optical means 104, isolates and reflects the first primary light beam of the white light to the first array 108 of M×N actuated mirrors 111, and transmits the second and third primary light beams to the second dichroic mirror 107. The second dichroic mirror, inclined at an angle, e.g., 45° and disposed between the third array 110 of M×N actuated mirrors 111 and the first dichroic mirror 106 facing the second array 109 of M×N actuated mirrors 111, upon receiving the second and third primary light beams from the first dichroic mirror 106, isolates and reflects the second primary light beam to the second array 109 of M×N actuated mirrors 111, and transmits the third primary light beam to the third array 110 of M×N actuated mirrors 111. Each of the actuated mirrors 111 in the arrays 108, 109, 110 includes a mirror 53 and an actuator 54 made of a piezoelectric material or an electrostrictive material which deforms in response to an electric field applied thereto. Each of the actuated mirrors 111 in the arrays 108, 109, 110 corresponds to each of the pixels to be displayed.

Each of the first, second and third field lenses 112, 113, 114, located between the first dichroic mirror 106 and the first array 108 of M×N actuated mirrors 111, the second dichroic mirror 107 and the second array 109 of M×N actuated mirrors 111, and the second dichroic mirror 107 and the third array 110 of M×N actuated mirrors 111, respectively, is used for collimating each of the primary light beams from each of the dichroic mirrors 106, 107 in the beam splitting means 105 to thereby uniformly illuminating each of the primary light beams onto the corresponding array of M×N actuated mirrors.

The optical path of the reflected primary light beams from each of the actuated mirrors 111 in each of the arrays 108, 109, 110 is determined by the amount of deflection thereof.

The reflected primary light beams from each of the undeflected actuated mirrors in each of the arrays 108, 109, 110 are focused back to projection stopper 115 by the corresponding field lens via the beam splitting means 105 and stopped by the light stopping portion 62 of the projection stopper 115 disposed between the projection lens 116 and the optical means 104, whereas the reflected primary light beams from each of the deflected actuated mirrors in each of the arrays 108, 109, 110 are focused back to projection stopper 115 by the corresponding field lens via the beam splitting means 105, along a third optical path so that a portion of the focused primary light beams passes through the light transmitting portion 52 of the projection stopper 115 to thereby modulating the intensity of the primary light beams.

In order for the primary light beams constituting the white light emitted from the non-point white light source 101 to form an image corresponding to an electrical signal on the projection screen 117, the optical path for each of the primary light beams between the optical means 104 and each of the arrays 108, 109, 110 of the actuated mirrors 111 must be of a same length. Furthermore, the optical path each of the primary light beams travels from the source stopper 103 to each of the arrays 108, 109, 110 of M×N actuated mirrors 111 and from each of the arrays 108, 109, 110 of M×N actuated mirrors 111 to the projection stopper 115 must be of a same length. This is accomplished by placing the source and projection stoppers 103, 115 at the focal point of the field lenses 112, 113, 114 employed therein. In addition, the light density of the optical projection system 200 is at its highest when all of the white light that passed through the light transmitting portion 51 of the source stopper 103 passes through the light transmitting portion 61 of the projection stopper 115, and this can be accomplished by making the light transmitting portions 51, 61 of the source and projection stoppers 103, 115 identical in shape and size.

The primary light beams from each of the actuated mirrors 111 in the arrays 108, 109, 110 which pass through the light transmitting portion 61 of the projection stopper 115 located at the focal point of the field lenses 112, 113, 114 are transmitted to the projection lens 116 which, in turn, projects the transmitted primary light beams onto the projection screen 117, thereby displaying each of the pixels to be displayed.

Instead of employing a complicated field lens system 5 between the beam splitting means 7 and the Schlieren bar 2 as observed in the prior art optical projection system 100, the inventive optical projection system 200 employs the trinity of field lenses 112, 113, 114, each of the field lenses being located between the first dichroic mirror 106 and the first array 108 of actuated mirrors 111, the second dichroic mirror 107 and the second array 109 of actuated mirrors 111, and the second dichroic mirror 107 and the third array 110 of actuated mirrors 111, respectively. Under such an arrangement, each of the primary light beams becomes less divergent and has a smaller beam diameter, and therefore, can be easily focused, thereby eliminating a need employ a complicated field lens system.

There is illustrated in FIG. 3 a schematic diagram of the inventive optical projection system 200 incorporating therein an optical means 104 having a total mirror 54 capable of a total reflection of the white light from the source stopper 103 onto the beam splitting means 105.

Alternatively, there is shown in FIG. 4 a schematic diagram of the inventive optical projection system 200 incorporating a polarization beam spitter (PBS) 55 and a λ/4 plate 56, wherein the PBS 55 is used for separating the white light into a pair of polarization beams, a first and a second polarization beams, and reflecting one of the polarization beams to the λ/4 plate 56, and the λ/4 plate 56, upon receiving the reflected polarization beam from the PBS 55, is used for changing the phase of the reflected polarization beam from the PBS 55 and transmitting the phase changed polarization beam to the beam splitting means 105.

While the present invention has been described with respect to certain preferred embodiments only, other modifications and variations may be made without departing from the scope of the present invention as set forth in the following claims.

What is claimed is:

1. An optical projection system capable of displaying an M×N number of pixels, wherein M and N are integers, comprising:

a non-point white light source for emitting a white light along a first optical path on a first optical plane, wherein the white light consists of a first, second and a third primary light beams, each of the primary light beams being one of the primary colors;

a trinity of arrays of M×N actuated mirrors, including a first, a second and a third array of M×N actuated mirrors, each of the actuated mirrors having an actuator and a mirror attached thereto, each of the actuated mirrors in the arrays being capable of changing the optical path of the primary light beams reflected therefrom;

a source stopper, provided with a light transmitting portion having a specific configuration and a light stopping portion and being placed on the first optical path on the first optical plane, for shaping the white light from the non-point white light source into a predetermined configuration;

a source lens, disposed between the source stopper and the non-point white light source, for focusing the white light emitted by the non-point white light source onto the source stopper;

an optical means for reflecting the white light from the source stopper at a predetermined angle;

a beam splitting means including a first and a second dichroic mirrors, wherein the first dichroic mirror, disposed between the optical means and the second dichroic mirror facing the first array of M×N actuated mirror, is used for isolating and reflecting the first primary light beam of the white light from the optical means to the first array of M×N actuated mirrors and for transmitting the second and third primary light beams to the second dichroic mirror, and the second dichroic mirror, disposed between the first dichroic mirror and the third array of M×N actuated mirrors facing the second array of M×N actuated mirrors, upon receiving the second and third primary light beams from, the first dichroic mirror, for isolating and reflecting the second primary light beam to the second array of M×N actuated mirrors, and for transmitting the third primary light beam to the third array of M×N actuated mirrors;

a trinity of field lenses including a first, a second and third field lenses, each of the first, second and third field lenses being located between the first dichroic mirror and, the first array of M×N actuated mirrors, between the second dichroic mirror and the second array of M×N actuated mirrors, and between the second dichroic mirror and the third array of M×N actuated mirrors, respectively, wherein each of the field lenses is used for collimating each of the primary light beams onto the corresponding array of M×N actuated mirrors and for refocusing each of the primary light beams reflected from each of the actuated mirrors in each of the arrays;

a projection screen for displaying an image made of the M×N number of pixels thereon; a projection stopper, provided with a light transmitting portion and a light stopping portion, passing a predetermined amount of the reflected primary light beams from the trinity of the arrays of M×N actuated mirrors; and a projection lens for projecting the primary light beams from the projection stopper onto the projection screen, thereby displaying each of the pixels corresponding thereto.

2. The optical projection system of claim 1, wherein the optical means comprises a total mirror capable of providing a total reflection of the white light from the source stopper.

3. The optical projection system of claim 1, wherein the source stopper comprises a light transmitting portion and a light stopping portion.

4. The optical projection system of claim 1, wherein the projection stopper comprises a light transmitting portion and a light stopping portion.

5. The optical projection system of claim 1, wherein the light transmitting portion of the source stopper is identical to the light transmitting portion of the projection stopper in shape and in size.

6. The optical projection system of claim 1, wherein the source and projection stoppers are positioned at the focal point of the field lenses employed therein.

7. An optical projection system capable of displaying an M×N number of pixels, wherein M and N are integers, comprising:

a non-point white light source for emitting a white light along a first optical path on a first optical plane, wherein the white light consists of a first, a second and a third primary light beams, each of the primary light beams being one of the primary colors;

a trinity of arrays of M×N actuated mirrors, including a first, a second and a third arrays of M×N actuated mirrors, each of the actuated mirrors having an actuator and a mirror attached thereto, each of the actuated mirrors in the arrays being capable of changing the optical path of the primary light beams reflected therefrom;

a source stopper, provided with a light transmitting portion having a specific configuration and a light stopping portion and being placed on the first optical path on the first optical plane, for shaping the white light from the non-point white light source into a predetermined configuration;

a source lens, disposed between the source stopper and the non-point white light source, for focusing the white light emitted by the non-point white light source onto the source stopper;

an optical means for reflecting the white light from the source stopper at a predetermined angle, wherein the optical means includes a polarization beam splitter- (PBS) and a λ/4 plate, the polarization beam splitter being used for separating the white light into a pair of polarization beams and reflecting one of the polarization beams to the λ/4 plate, and the λ/4 plate, upon receiving the reflected polarization beam from the polarization beam splitter, for changing a phase of the reflected polarization beam;

a beam splitting means including a first and a second dichroic mirrors, wherein the first dichroic mirror, disposed between the optical means and the second dichroic mirror facing the first array of M×N actuated mirrors, is used for isolating and reflecting the phase changed reflected polarization beam from the optical means to the first array of M×N actuated mirrors and for transmitting the second and the third primary light beams to the second dichroic mirror, and the second dichroic mirror, disposed between the first dichroic mirror and the third array of M×N actuated mirrors facing the second array of M×N actuated mirrors, upon receiving the second and the third primary light beams from the first dichroic mirror, for isolating and reflecting the second primary light beam to the second array of M×N actuated mirrors, and for transmitting the third light beam to the third array of M×N actuated mirrors;

a trinity of field lenses including a first, a second and a third field lenses, each of the first, the second and the third lenses being located between the first dichroic mirror and the first array of M×N actuated mirrors, between the second dichroic mirror and the second array of M×N actuated mirrors, and between the second dichroic mirror and the third array of M×N actuated mirrors, respectively, wherein each of the field lenses is used for colliminating each of the primary light beams onto the corresponding array of M×N actuated mirrors and for refocusing each of the primary light beams reflected from each of the actuated mirrors in each of the arrays;

a projection screen for displaying an image made of the M×N number of pixels thereon;

a projection stopper, provided with a light transmitting portion and a light stopping portion, passing a predetermined amount of the reflected primary light beams from the trinity of the arrays of M×N actuated mirrors; and a projection lens for projecting the primary light beams from the projection stopper onto the primary light beams from the projection stopper onto the projection screen, thereby displaying each of the pixels corresponding thereto.

8. The optical projection system of claim 7, wherein the source stopper includes a light transmitting portion and a light stopping portion.

9. The optical projection system of claim 7, wherein the projection stopper includes a light transmitting portion and a light stopping portion.

10. The optical projection system of claim 7, wherein the light transmitting portion of the source stopper is identical to the light transmitting portion of the projection stopper in shape and in size.

11. The optical projection system of claim 7, wherein the source and the projection stoppers are positioned at the focal point of the field lenses employed therein.

* * * * *